US012609442B2

(12) United States Patent
Randjelovic et al.

(10) Patent No.: US 12,609,442 B2
(45) Date of Patent: Apr. 21, 2026

(54) TRANSPONDER EQUIPPED WITH A SPIRAL ANTENNA

(71) Applicant: The Swatch Group Research and Development Ltd, Marin (CH)

(72) Inventors: Zoran Randjelovic, Corcelles (CH); Jérôme Maspoli, Gampelen (CH)

(73) Assignee: The Swatch Group Research and Development Ltd, Marin (CH)

( * ) Notice: Subject to any disclaimer, the term of this patent is extended or adjusted under 35 U.S.C. 154(b) by 263 days.

(21) Appl. No.: 18/304,439

(22) Filed: Apr. 21, 2023

(65) Prior Publication Data

US 2023/0352820 A1 Nov. 2, 2023

(30) Foreign Application Priority Data

Apr. 29, 2022 (EP) ..................................... 22170762

(51) Int. Cl.

*H01Q 1/36* (2006.01)
*G04G 17/04* (2006.01)
*H01Q 1/27* (2006.01)
*H01Q 11/12* (2006.01)
*H01Q 21/00* (2006.01)

(52) U.S. Cl.

CPC ............... *H01Q 1/36* (2013.01); *G04G 17/04* (2013.01); *H01Q 1/273* (2013.01); *H01Q 21/0006* (2013.01)

(58) Field of Classification Search

None

See application file for complete search history.

(56) References Cited

U.S. PATENT DOCUMENTS 6,825,751 B1 * 11/2004 Kita ........................ G06K 19/04 343/718
2005/0001779 A1 * 1/2005 Copeland ........... G08B 13/2471 343/742
2009/0040116 A1 2/2009 Eray
2010/0038432 A1 * 2/2010 Mueller-Hipper ..... B42D 25/00 29/601
2011/0140671 A1 6/2011 Kim et al.
2016/0380339 A1 12/2016 Cordier et al.
2017/0040688 A1 2/2017 Peralta et al.
2021/0066802 A1 * 3/2021 Liu .......................... H04B 5/79
2021/0408686 A1 * 12/2021 Singh ..................... H04B 5/263

OTHER PUBLICATIONS

European Search Report for EP 22 17 0762, dated Sep. 30, 2022.

* cited by examiner

*Primary Examiner* — John F Mortell
(74) *Attorney, Agent, or Firm* — Sughrue Mion, PLLC

(57) ABSTRACT

A transponder (1) including an electronic system (3) for managing the sending and receiving of data and a spiral antenna (2), the spiral antenna (2) including a wound strip forming a plurality of coils (11), the electronic system (3) being connected to the spiral antenna (2) by two connection points (6) arranged on the strip. The coils (11) included between the two connection points (6) form a first set of coils (4), the spiral antenna (2) including a second set of coils (5) extending outside the connection points (6). Also, an electronic device, particularly a timepiece including such a transponder (1).

17 Claims, 2 Drawing Sheets

TRANSPONDER EQUIPPED WITH A SPIRAL ANTENNA

CROSS REFERENCE TO RELATED APPLICATIONS

This application claims priority to European Patent Application No. 22170762.3 filed Apr. 29, 2022, the entire contents of which are incorporated herein by reference.

TECHNICAL FIELD OF THE INVENTION

The invention relates to the field of information transmissions and telecommunications, and in particular transponders including emitting and/or receiving antennas.

TECHNOLOGICAL BACKGROUND

Transponders are electronic devices configured to send and/or receive data. Passive RFID (Radio Frequency Identification) transponders exist, which are often intended to encode and record products.

Other passive transponders are for example used in terminals and bank cards, for example for a contactless payment. These transponders are generally NFC (Near Field Communication) type, and enable data transfer at short distances.

Communication is established between two terminals, each terminal comprising an electronic system for managing and recording data, as well as an antenna for sending and receiving the data from the other terminal.

The antenna is of major importance for determining the emitting/receiving operating distance between the terminals, but the dimensions thereof must be very small to limit the size of the terminals. For this purpose, spiral portion-shaped antennas exist, which make it possible to have a sufficient antenna length in minimum space. The number of coils determines the inductance of the antenna. The connection points of the electronic system are arranged at the two ends of the spiral portion, i.e. at the outer end and at the inner end of the spiral portion to have a sufficient inductance and to arrive at a maximum communication distance.

When this is not enough, a second antenna is arranged in parallel with the first antenna, in order to increase the communication distance. The second antenna operates as a resonant circuit, such that the nominal frequency of the set of both antennas does not change with respect to the nominal frequency of the spiral portion alone. Thanks to the second antenna, an increase in the communication distance is obtained.

However, the improvement is limited and is not always sufficient for the applications sought.

SUMMARY OF THE INVENTION

The purpose of the invention is that of remedying the drawbacks mentioned above, and it is aimed at providing a transponder including an electronic system for managing the sending and receiving of data and a spiral antenna, the spiral antenna including a wound strip forming a plurality of coils, the electronic system being connected to the spiral antenna by two connection points arranged on the strip.

The transponder is remarkable in that the coils comprised between the two connection points form a first set of coils, the spiral antenna including a second set of coils extending outside the connection points.

The second set of coils, which extends outside the connection points of the electronic system, makes it possible to improve the communication distance of the spiral antenna by 10 to 20%. Thus, the transponder can comply with specific operating standards while retaining a small size.

Thanks to the invention, specific electronic devices can be used, for example a watch type timepiece, for NFC type data transfer uses. In particular, this watch can be equipped with a payment system usable as a bank payment card at short distances.

According to a specific embodiment of the invention, the first set of coils comprises the outer coils of the spiral antenna and the second set of coils comprises the inner coils of the spiral antenna.

According to a specific embodiment of the invention, the first set of coils and the second set of coils are linked, such that the spiral antenna is continuous.

According to a specific embodiment of the invention, the first set of coils and the second set of coils are separated, such that the spiral antenna is discontinuous, a gap being arranged at the boundary of the first set of coils and the second set of coils.

According to a specific embodiment of the invention, the first set of coils and the second set of coils extend in the same plane.

According to a specific embodiment of the invention, the second set is free of connection.

According to a specific embodiment of the invention, the transponder comprises a resonant circuit, the resonant circuit including the second set of coils.

According to a specific embodiment of the invention, the resonant circuit includes a capacitor connected to the second set of coils by two connection points, such that a third set of inner coils is arranged between the two connection points of the capacitor.

According to a specific embodiment of the invention, the second set of inner coils comprises a fourth set of inner coils extending beyond the third set of inner coils According to a specific embodiment of the invention, the fourth set of inner coils is free of connection.

According to a specific embodiment of the invention, the third set of inner coils and the fourth set of inner coils are linked such that the second set of coils is continuous.

According to a specific embodiment of the invention, the transponder is NFC type, particularly to serve as a method of payment.

The invention also relates to an electronic device comprising such a transponder.

According to a specific embodiment of the invention, the electronic device is a timepiece, such as a watch.

According to a specific embodiment of the invention, the spiral antenna forms a dial of the timepiece.

BRIEF DESCRIPTION OF THE FIGURES

The purposes, advantages and features of the present invention will become apparent after reading several embodiments, which are provided for purposes of illustration only and not intended to limit the scope of the invention, given with reference to the accompanying drawings, wherein.

DETAILED DESCRIPTION OF THE INVENTION

Figure 1:
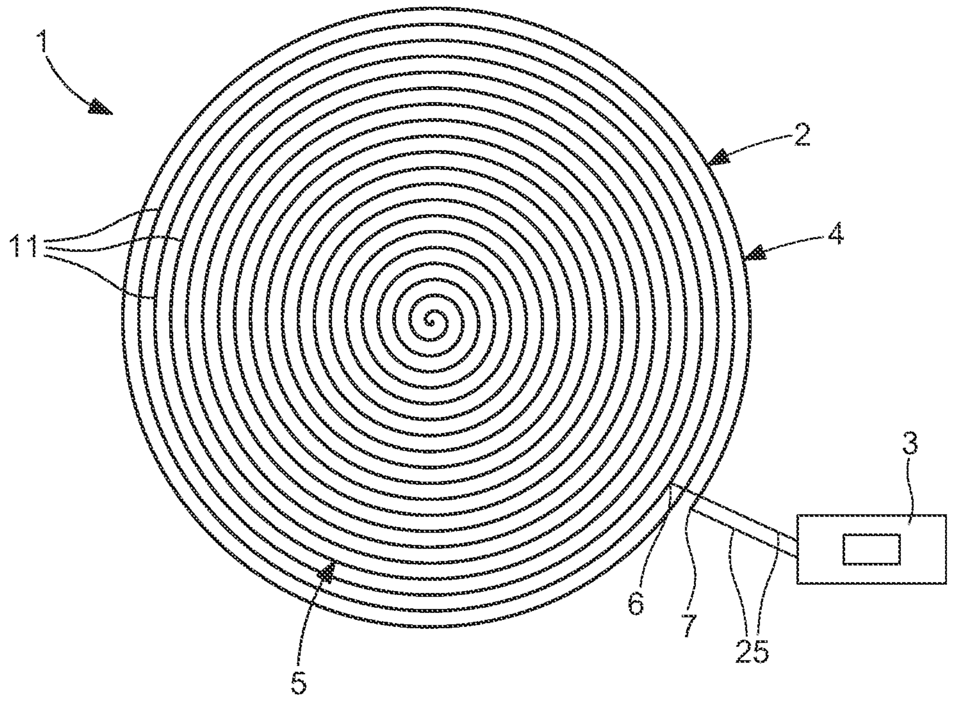
FIG. 1 shows a schematic representation of a top view of a first embodiment of a transponder according to the invention.
Figure 2:
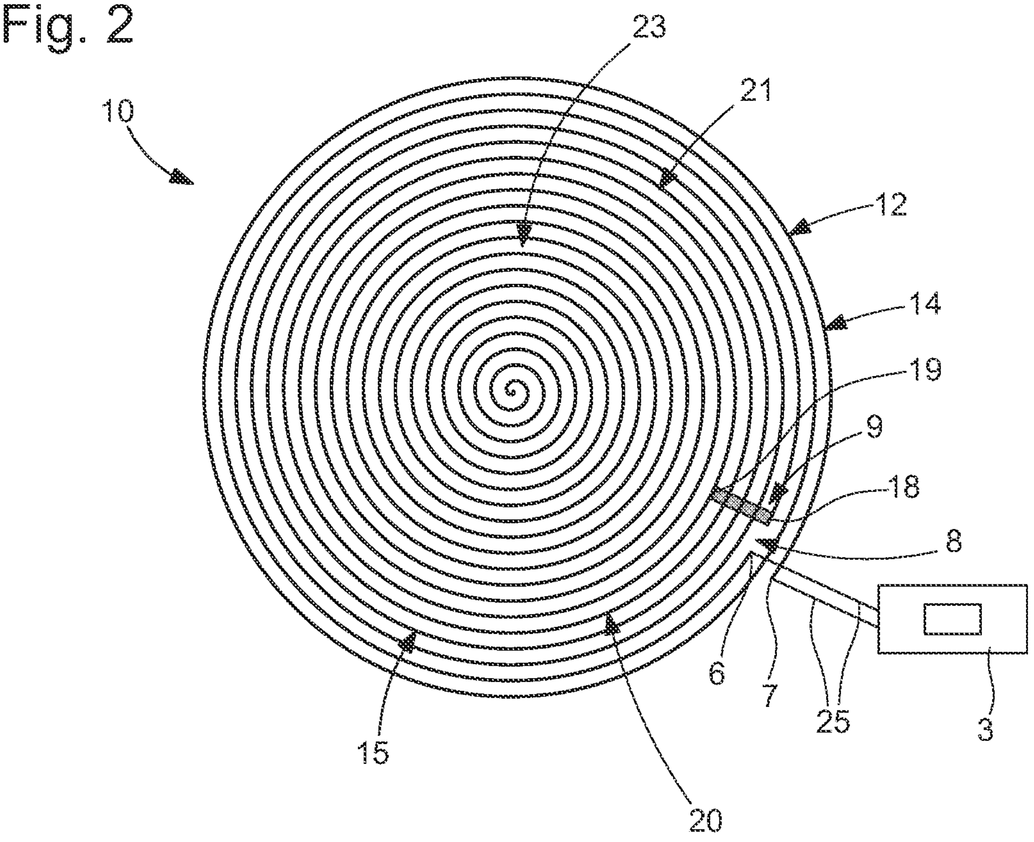
FIG. 2 shows a schematic representation of a top view of a second embodiment of a transponder according to the invention.

In FIGS. 1 and 2, two embodiments of a transponder 1, 10 including an electronic system 3 for managing the sending and receiving of data and a spiral antenna 2, 12, are represented. The communication protocol is for example NFC (Near Field Communication) type. This technology is used in particular for payment methods, for example for payment cards, which can pay remotely using so-called "contactless" terminals.

The spiral antenna 2, 12 includes a wound strip forming a plurality of coils 11.

The electronic system is for example an integrated circuit equipped with a chip configured to manage NFC type communications. The electronic system 3 is connected to the spiral antenna 2 by two connection points 6, 7 arranged on the strip. The coils 11 comprised between the two connection points 6, 7 form a first set of coils 4, 14.

According to the invention, the spiral antenna 2, 12 includes a second set of coils 5, 15 extending outside the connection points 6, 7.

The second set of coils 5, 15 comprises several of the most concentric adjacent coils of the spiral antenna 2, 12, and of which the radius of curvature is the lowest. In FIG. 1, the second set of coils 5, 15 comprises all the inner coils from the most concentric connection point of the spiral antenna 2, 12. Thus, the second set of coils 5, 15 comprises here at least twenty-five coils. It can obviously comprise fewer or more thereof, for example around ten, twenty, thirty coils or more.

Preferably, in these embodiments, the first set of coils 4, 14 comprises the outer coils 11 of the spiral antenna 2 and the second set of coils 5, 15 comprises the inner coils 11 of the spiral antenna 2, 12.

The first set of coils 4, 14 and the second set of coils 5, 15 extend substantially in the same plane. Thus, the spiral antenna 2, 12 extends substantially in the same plane in order to minimise the thickness of the spiral antenna 2, 12. All the coils 11 of the spiral antenna 2, 12 are wound in the same plane.

The first set of coils 4, 14 comprises several of the most off-centre adjacent coils of the spiral antenna 2, 12, and of which the radius of curvature is the highest. In FIGS. 1 and 2, the first set of coils 4, 14 comprises two coils. The first set of coils 4, 14 can obviously comprise more thereof, for example three, four, five or more, or a single coil or part of a coil.

The two connection points 6, 7 are preferably arranged at the two ends of the first set of outer coils 4, 14. In other words, the two connection points 6, 7 are respectively arranged at the most off-centre point and at the most concentric point of the first set of coils 4, 14.

A pair of wires 25 connect the two connection points 6, 7 to the electronic system 3. The wires 25 are for example soldered or glued to the connection points 6, 7 and to the integrated circuit.

In the first embodiment represented in FIG. 1, the first set of coils 4 and the second set of coils 5 are linked, such that the spiral antenna 2 is continuous. Thus, this gives a continuous spiral antenna 2 formed of the two sets of coils.

Furthermore, the second set of coils 5 is free of connection. In other words, there is no connection on the second set of coils 5, either with the electronic system 3 or another component.

The second set of coils 5 makes it possible to improve the remote data transmission range between this transponder 1 and another transponder or a terminal. Indeed, the second set of coils 5 makes it possible to store more energy than the first set of coils 4 alone. This additional energy thus makes it possible to increase the transmission distance.

The second embodiment of FIG. 2 shows a spiral antenna 12 wherein the first set of coils 14 and the second set of coils 15 are separated, such that the spiral antenna 2 is discontinuous. In other words, the spiral antenna 12 comprises two separate parts separated by a gap 8 arranged at the boundary of the first set of coils 14 and the second set of coils 15. Thus, the two sets of coils 14, 15 are not directly connected to each other.

The gap 8 is preferably disposed after the most concentric connection point 6 of the two connection points 6, 7. Thus, the two connection points 6, 7 are therefore not connected to the second set of coils 15.

In this embodiment, the transponder 10 comprises a resonant circuit 20. The resonant circuit 20 includes the second set of coils 15.

Furthermore, the resonant circuit 20 includes a capacitor 9 connected to the second set of coils 15. The capacitor 9 is connected to two connection points 18, 19. A connection point 18 is disposed at the end of the most off-centre inner coil 11 of the second set of coils 15. The other connection point 19 is disposed on a more concentric inner coil 11, such that several inner coils 11 are comprised between the two connection points 18, 19 of the capacitor 9. The capacitor 9 is arranged beyond the gap 8 between the first 14 and the second set of coils 15.

Thus, a third set of inner coils 21 is arranged between the two connection points 18, 19 of the capacitor 9.

Only a portion of the coils 11 of the second set of coils 15 belongs to the third set of inner coils 21, as the most concentric connection point 19 of the capacitor 9, is not arranged at the centre of the spiral antenna 12.

Thus, the second set of inner coils 15 comprises a fourth set of inner coils 23 extending beyond the third set of inner coils 21. The fourth set of inner coils 23 extends concentrically beyond the connection points of the capacitor 8, and corresponds to the set of inner coils of the second set of inner coils 15 less the third set of inner coils 21.

The third set of inner coils 21 and the fourth set of inner coils 23 are linked, such that the second set of coils 15 is continuous.

The fourth set of inner coils 23 is free of connection. In other words, there is no connection on the fourth set of coils 5, either with the electronic system 3 or another component.

Thanks to the resonant circuit 20, this embodiment of the transponder makes it possible to increase the data transfer range further by 30 to 40%.

Such a transponder can be used in an electronic product. For example, a timepiece configured to make payments like a bank card. The NFC type transponder enables for example payment at short distances, referred to as "contactless".

Figure 3:
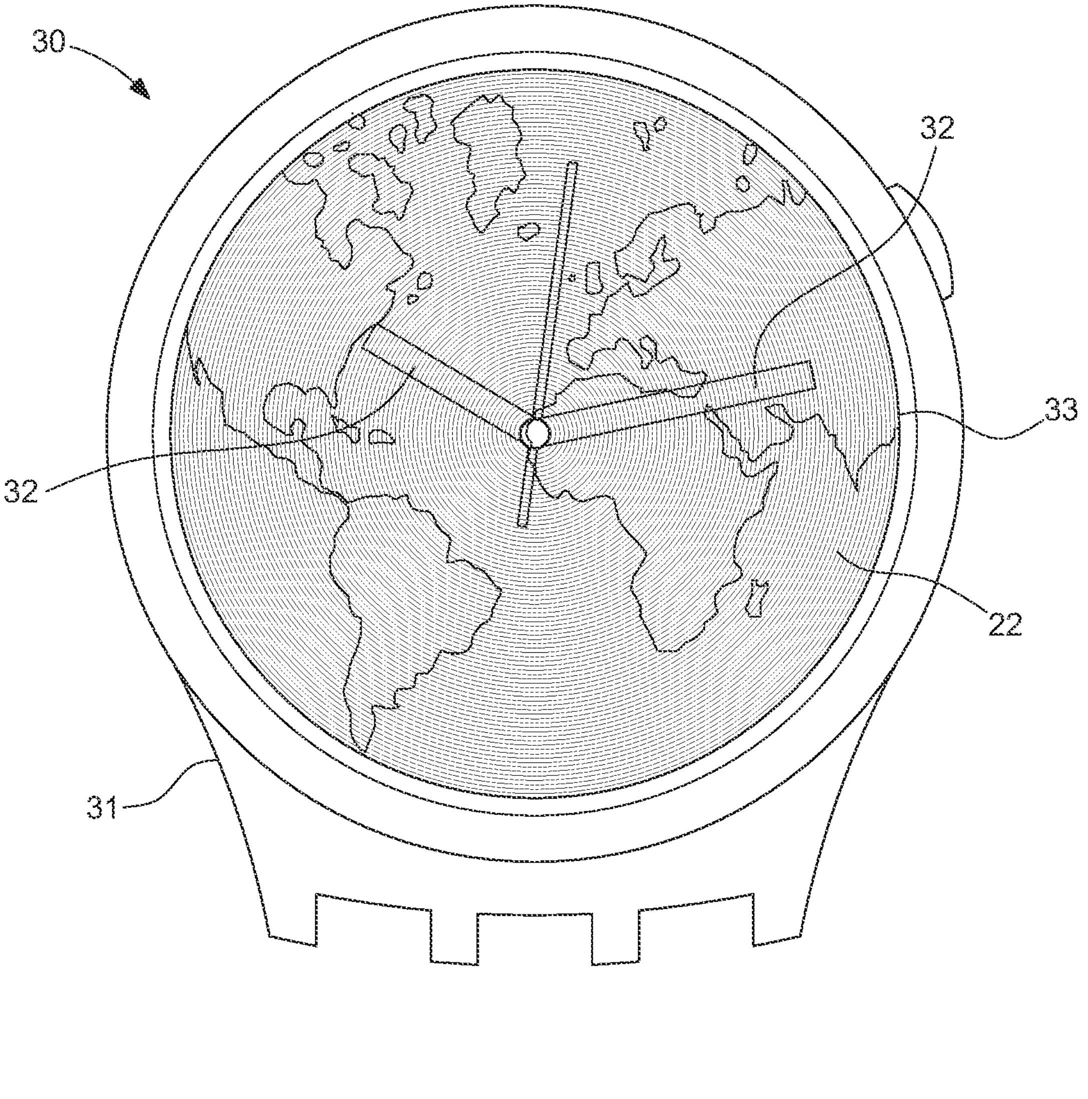
FIG. 3 shows a schematic representation of a top view of a watch including a transponder according to the invention.

In FIG. 3, a watch 30 comprising a transponder according to the invention is represented. The watch 30 comprises a case 31, housing a horological movement, preferably an electronic movement, and hands 32 to indicate the time. The transponder is also transposed in the case 31. In this embodiment, the spiral antenna 22 of the transponder is used as a dial of the watch 30. The spiral antenna 22 is arranged under the crystal 33 of the watch 30. The hands 32 move above the spiral antenna 22, the spiral antenna 22 being visible through the crystal 33 by a user. The electronic system 3, the contact points, and the capacitor in the case of the second embodiment, are arranged under the spiral antenna 22 to be hidden.

Optionally, the top surface of the spiral antenna 22 comprises a pattern, for a decorative purpose or to indicate hour indices for example.

It goes without saying that the invention is not limited to the transponder and electronic embodiments described with reference to the figures and alternatives can be considered without leaving the scope of the invention.

The invention claimed is:

1. A transponder, comprising:

an electronic system for managing the sending and receiving of data; and a spiral antenna, wherein the spiral antenna includes a wound strip forming a plurality of coils, wherein the electronic system is connected to the spiral antenna by only two connection points arranged on the strip, and wherein coils comprised between the two connection points form a first set of coils, the spiral antenna including a second set of coils extending outside the connection points.

2. The transponder according to claim 1, wherein the first set of coils comprise the outer coils of the spiral antenna and the second set of coils comprise the inner coils of the spiral antenna.

3. The transponder according to claim 1, wherein the first set of coils and the second set of coils are linked, such that the spiral antenna is continuous.

4. The transponder according to claim 1, wherein the first set of coils and the second set of coils are separated, such that the spiral antenna is discontinuous, a gap being arranged at the boundary of the first set of coils and the second set of coils.

5. The transponder according to claim 1, wherein the first set of coils and the second set of coils extend in the same plane.

6. The transponder according to claim 1, wherein the second set is free of connection.

7. The transponder according to claim 1, further comprising a resonant circuit, the resonant circuit including the second set of coils.

8. The transponder according to claim 7, wherein the resonant circuit includes a capacitor connected to the second set of coils by two connection points, such that a third set of inner coils is arranged between the two connection points of the capacitor.

9. The transponder according to claim 7, wherein the second set of inner coils comprises a fourth set of inner coils extending beyond the third set of inner coils.

10. The transponder according to claim 9, wherein the fourth set of inner coils is free of connection.

11. The transponder according to claim 9, wherein the third set of inner coils and the fourth set of inner coils are linked, such that the second set of coils is continuous.

12. The transponder according to claim 1, wherein the transponder is NFC type, to serve as a method of payment.

13. An electronic device comprising a transponder according to claim 1.

14. The electronic device according to claim 13, wherein the electronic device is a timepiece.

15. The electronic device according to claim 14, wherein the spiral antenna forms a dial of the timepiece.

16. The transponder according to claim 1, wherein along a spiral of the spiral antenna from an inside to an outside of the spiral of the spiral antenna, the two connection points, which are the only two connection points arranged on the strip by which the electronic system is connected to the spiral antenna, are moreso outer of the spiral than is the second set of coils.

17. The transponder according to claim 16, wherein along a spiral of the spiral antenna from an inside to an outside of the spiral of the spiral antenna, two points along the second set of coils are connected to respective nodes of a capacitor, the capacitor being arranged more so inner of the spiral than are the two connection points.

* * * * *